US011837260B2

(12) United States Patent
Baron et al.

(10) Patent No.: US 11,837,260 B2
(45) Date of Patent: Dec. 5, 2023

(54) ELASTIC CLOUD VIDEO EDITING AND MULTIMEDIA SEARCH

(71) Applicant: Intel Corporation, Santa Clara, CA (US)

(72) Inventors: Charles Baron, Chandler, AZ (US); Sherry Chang, El Dorado Hills, CA (US); Robert L. Vaughn, Albuquerque, NM (US); Kevin Jacobs, Hillsboro, OR (US); Jeffrey Caroli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/365,831

(22) Filed: Jul. 1, 2021

(65) Prior Publication Data

US 2021/0327472 A1    Oct. 21, 2021

Related U.S. Application Data

(60) Continuation of application No. 15/854,145, filed on Dec. 26, 2017, now Pat. No. 11,056,148, which is a
(Continued)

(51) Int. Cl.
*G11B 27/036* (2006.01)
*G06F 16/732* (2019.01)
(Continued)

(52) U.S. Cl.
CPC .......... *G11B 27/036* (2013.01); *G06F 16/738* (2019.01); *G06F 16/7335* (2019.01);
(Continued)

(58) Field of Classification Search
USPC .................................. 386/239–262, 278–290
See application file for complete search history.

(56) References Cited

U.S. PATENT DOCUMENTS 6,581,102 B1    6/2003  Amini et al.
9,852,769 B2   12/2017  Baron et al.
(Continued)

FOREIGN PATENT DOCUMENTS

CN    101180870 A    5/2008
CN    101421724 A    4/2009
(Continued)

OTHER PUBLICATIONS

Japanese Patent Office: "Decision of Refusal," mailed in connection with Japanese Patent Application No. 2016-510661, dated Jun. 27, 2017, 11 pages.
(Continued)

*Primary Examiner* — Hung Q Dang
(74) *Attorney, Agent, or Firm* — HANLEY, FLIGHT & ZIMMERMAN, LLC

(57) ABSTRACT

Technologies for cloud-based media search and editing include a video editor configured to build a media query and associate the media query with a dynamic content slot of a media program. When generating video output based on the media program, the video editor transmits the media query to a cloud analytics server and receives search results identifying one or more media clips produced by a number of mobile computing devices. The video editor may display a list of clips for selection by the user or may automatically include one of the clips in the output. The cloud analytics server transmits an acceptance policy defining criteria for acceptable media, based on the media query, to the mobile computing devices. The mobile computing devices configure capture settings according to the acceptance policy and may display a user interface to assist the user in capturing acceptable media. Other embodiments are described and claimed.

19 Claims, 8 Drawing Sheets

Related U.S. Application Data division of application No. 14/129,153, filed as application No. PCT/US2013/041865 on May 20, 2013, now Pat. No. 9,852,769.

(51) Int. Cl.
  *G06F 16/738* (2019.01)
  *H04N 21/218* (2011.01)
  *H04N 21/231* (2011.01)
  *H04N 21/8405* (2011.01)
  *H04N 21/854* (2011.01)

(52) U.S. Cl.
  CPC . *H04N 21/21805* (2013.01); *H04N 21/23109* (2013.01); *H04N 21/8405* (2013.01); *H04N 21/854* (2013.01)

(56) References Cited

U.S. PATENT DOCUMENTS

| | | | |
|---|---|---|---|
| 11,056,148 | B2 | 7/2021 | Baron et al. |
| 2004/0158866 | A1 | 8/2004 | Saruhashi |
| 2005/0001904 | A1* | 1/2005 | Kiiskinen .......... H04N 1/32112 348/207.1 |
| 2005/0038814 | A1 | 2/2005 | Iyengar et al. |
| 2005/0050020 | A1* | 3/2005 | Oki ..................... G06F 16/7834 |
| 2006/0018542 | A1* | 1/2006 | Shuster ................. G06F 16/50 382/181 |
| 2006/0064642 | A1 | 3/2006 | Iyer |
| 2007/0061301 | A1 | 3/2007 | Ramer et al. |
| 2007/0239787 | A1 | 10/2007 | Cunningham |
| 2008/0052630 | A1 | 2/2008 | Rosenbaum et al. |
| 2008/0101762 | A1 | 5/2008 | Kellock |
| 2008/0243756 | A1* | 10/2008 | Moon ................ G06Q 30/0272 |
| 2011/0093492 | A1 | 4/2011 | Sull et al. |
| 2012/0192225 | A1 | 7/2012 | Harwell et al. |
| 2012/0251080 | A1 | 10/2012 | Svendsen et al. |
| 2012/0330889 | A1 | 12/2012 | Swart et al. |
| 2013/0006980 | A1 | 1/2013 | Frumin |
| 2013/0066844 | A1 | 3/2013 | Bowers et al. |
| 2013/0095855 | A1* | 4/2013 | Bort ....................... G06T 17/05 455/456.2 |
| 2013/0120595 | A1* | 5/2013 | Roach ............... G06Q 20/3276 348/207.1 |
| 2013/0173635 | A1 | 7/2013 | Sanjeev |
| 2013/0205333 | A1 | 8/2013 | Han et al. |
| 2013/0311079 | A1* | 11/2013 | Rakshit ............. G01C 21/3623 701/400 |
| 2014/0006385 | A1* | 1/2014 | Ebers ..................... G06F 16/54 707/722 |
| 2014/0082633 | A1 | 3/2014 | Kim et al. |
| 2014/0169697 | A1* | 6/2014 | Breckenridge .... G06Q 30/0621 382/284 |
| 2014/0254942 | A1 | 9/2014 | Liu et al. |
| 2015/0254694 | A1* | 9/2015 | Filip .................. G06Q 30/0207 705/14.1 |
| 2016/0078900 | A1 | 3/2016 | Baron et al. |
| 2017/0004148 | A1 | 1/2017 | Liu |
| 2018/0294011 | A1 | 10/2018 | Baron et al. |

FOREIGN PATENT DOCUMENTS

| | | |
|---|---|---|
| CN | 102036106 A | 4/2011 |
| JP | 2003-006555 A | 1/2003 |
| JP | 2003150484 A | 5/2003 |
| JP | 2005266205 A | 9/2005 |
| JP | 2005-303840 A | 10/2005 |
| JP | 2006135515 A | 5/2006 |
| JP | 2012032939 A | 2/2012 |
| JP | 2012181730 A | 9/2012 |

OTHER PUBLICATIONS

NEC Corporation: "Contents Director, Streaming Delivery Solution, Powered by Gridlow," Nov. 10, 2011, 2 pages.
FUJITSU: "FUJITSU Image Solution," FG7791-1-1, Oct. 2011, 8 pages. Retrieved from https://www.fujitsu.com/p/documents/services/indrastructure/network/media-solutions/prochures/media-solutions.pdf.
Shiratori: "Connection to the Future, Digital Series 3, Information Network," Kyoritsu Shuppan Co., Ltd., Nov. 15, 2011, 2 pages.
European Patent Office: "European Search Report," mailed in connection with European Patent Application No. 13885287.6-1208, dated Nov. 3, 2016, 7 pages.
Japanese Patent Office: "Notice of Reasons for Refusal," mailed in connection with Japanese Patent Application No. 2016-510661, dated Nov. 1, 2016, 25 pages.
Taguchi et al.: "YouTube Perfect Guidebook," the first edition, Sotech-sha, Oct. 12, 2012, pp. 122-131.
Nambu: "Content Metadata Management in XML. Realizing WWW Search Video and Audio," Telecommunication, No. 218, Aug. 25, 2002, pp. 110-114.
Hayashi et al.: "Generating Content Descriptive Metadata by Applying Voice Recognition/Language Processing," NTT Technical Journal, vol. 15, No. 4, Apr. 1, 2003, pp. 21-24.
International Searching Authority: "International Search Report and Written Opinion," mailed in connection with International Patent Application No. PCT/US2013/041865, dated Feb. 28, 2014, 12 pages.
Wikipedia: "Video Editing," edited Sep. 20, 2012, 3 pages. Retrieved from http://en.wikipedia.org/w/index.php?title=Video_editing&oldid=513777744.
Wikipedia: "Crowdsourcing," edited Sep. 15, 2012, 10 pages. Retrieved from http://en.wikipedia.org/w/index.php?title=Crowdsourcing&oldid=512697365.
Chang: "Animoto's New Mobile App Promises Easy Video Slideshow Creation," Macworld, Dec. 19, 2011, 2 pages. Retrieved from http://www.macworld.com/article/1164385/animoto_mobile_app_promises_easy_video_slideshow_creation.
United States Patent and Trademark Office: "Notice of Allowance," mailed in connection with U.S. Appl. No. 14/129,153, dated Aug. 15, 2017, 6 pages.
United States Patent and Trademark Office: "Final Office Action," mailed in connection with U.S. Appl. No. 14/129,153, dated May 31, 2017, 12 pages.
United States Patent and Trademark Office: "Non-final Office Action," mailed in connection with U.S. Appl. No. 14/129,153, dated Feb. 24, 2017, 12 pages.
United States Patent and Trademark Office: "Advisory Action," mailed in connection with U.S. Appl. No. 14/129,153, dated Nov. 1, 2016, 5 pages.
United States Patent and Trademark Office: "Final Office Action," mailed in connection with U.S. Appl. No. 14/129,153, dated Aug. 18, 2016, 11 pages.
United States Patent and Trademark Office: "Non-final Office Action," mailed in connection with U.S. Appl. No. 14/129,153, dated May 18, 2016, 12 pages.
United States Patent and Trademark Office: "Requirement for Restriction/Election," mailed in connection with U.S. Appl. No. 14/129,153, dated Mar. 14, 2016, 7 pages.
The State Intellectual Property Office of People's Republic of China: "The Third Office Action," mailed in connection with Chinese Patent Application No. 201380075807.5, dated Sep. 25, 2018, 7 pages with English translation.
Japanese Patent Office: "Notice of Reasons for Refusal," mailed in connection with Japanese Patent Application No. 2016-510661, dated Sep. 4, 2018, 24 pages including English translation.
Harada et al.: "Multivideo-Server-Based News Video Exchange System (JNEX) [the latter volume]", Broadcast Engineering, October Issue, 1998, vol. 1, No. 10, Oct. 1, 1998, Kenrokukan Publishing Co., Ltd., pp. 113-127, ISSN: 0287-8658.
Japanese Patent Office: "Office Action," mailed in connection with Japanese Patent Application No. 2017-013838, dated Sep. 11, 2018, 7 pages including English translation.

(56) References Cited

OTHER PUBLICATIONS

The State Intellectual Property Office of People's Republic of China: "The First Office Action," mailed in connection with Chinese Patent Application No. 201380075807.5, dated Oct. 10, 2017, 11 pages.
Japanese Patent Office: Translation of "Office Action," mailed in connection with Japanese Patent Application No. 2017-013838, dated May 29, 2018, 6 pages.
European Patent Office: "Communication pursuant to Article 94(3) EPC," mailed in connection with European Patent Application No. 13885287.6-1208, dated Feb. 5, 2018, 5 pages.
The State Intellectual Property Office of People's Republic of China: "The Second Office Action," mailed in connection with Chinese Patent Application No. 201380075807.5, dated Apr. 8, 2018, 11 pages with English translation.
United States Patent and Trademark Office: "Notice of Allowance," mailed in connection with U.S. Appl. No. 15/854,145, dated Mar. 1, 2021, 8 pages.
United States Patent and Trademark Office: "Advisory Action," mailed in connection with U.S. Appl. No. 15/854,145, dated Aug. 27, 2020, 3 pages.
United States Patent and Trademark Office: "Final Office Action," mailed in connection with U.S. Appl. No. 15/854,145, dated Jun. 15, 2020, 11 pages.
United States Patent and Trademark Office: "Non-Final Office Action," mailed in connection with U.S. Appl. No. 15/854,145, dated Mar. 12, 2020, 11 pages.
United States Patent and Trademark Office: "Advisory Action," mailed in connection with U.S. Appl. No. 15/854,145, dated Dec. 23, 2019, 3 pages.
United States Patent and Trademark Office: "Final Office Action," mailed in connection with U.S. Appl. No. 15/854,145, dated Oct. 11, 2019, 11 pages.
United States Patent and Trademark Office: "Non-Final Office Action," mailed in connection with U.S. Appl. No. 15/854,145, dated Jun. 14, 2019, 10 pages.
United States Patent and Trademark Office: "Non-Final Office Action," mailed in connection with U.S. Appl. No. 15/854,145, dated Dec. 13, 2018, 6 pages.

* cited by examiner

ELASTIC CLOUD VIDEO EDITING AND MULTIMEDIA SEARCH

RELATED APPLICATION(S)

This patent arises from a continuation of U.S. patent application Ser. No. 15/854,145 (now U.S. Pat. No. 11,056,148), which is titled "ELASTIC CLOUD VIDEO EDITING AND MULTIMEDIA SEARCH," and which was filed on Dec. 26, 2017, which is divisional of U.S. patent application Ser. No. 14/129,153 (now U.S. Pat. No. 9,852,769), which is titled "ELASTIC CLOUD VIDEO EDITING AND MULTIMEDIA SEARCH," and which was filed on Dec. 24, 2013, which corresponds to the U.S. national stage of International Patent Application No. PCT/US2013/041865, which is titled "ELASTIC CLOUD VIDEO EDITING AND MULTIMEDIA SEARCH," and which was filed on May 20, 2013. Priority to U.S. patent application Ser. No. 15/854,145, U.S. patent application Ser. No. 14/129,153 and International Patent Application No. PCT/US2013/041865 is claimed. U.S. patent application Ser. No. 15/854,145, U.S. patent application Ser. No. 14/129,153 and International Patent Application No. PCT/US2013/041865 are hereby incorporated herein by reference in their respective entireties.

BACKGROUND

Video production is typically laborious and time-consuming. When assembling a video program from a collection of video clips, a video producer must organize a large number of video clips, evaluate each video clip for content, and arrange the selected video clips as desired. Particularly for live video production, typical systems require large numbers of human operators to incorporate large numbers of cameras or video sources into a single video production.

Cloud computing services allow for data processing and storage distributed over a ubiquitous network such as the Internet. Cloud computing may be scalable to grow or shrink available computing and storage resources according to current demand. Cloud computing services may collect and distribute content produced by numerous mobile devices with persistent network connections. Such "crowd-sourced" content may provide numerous unique, individualized views of the same event.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
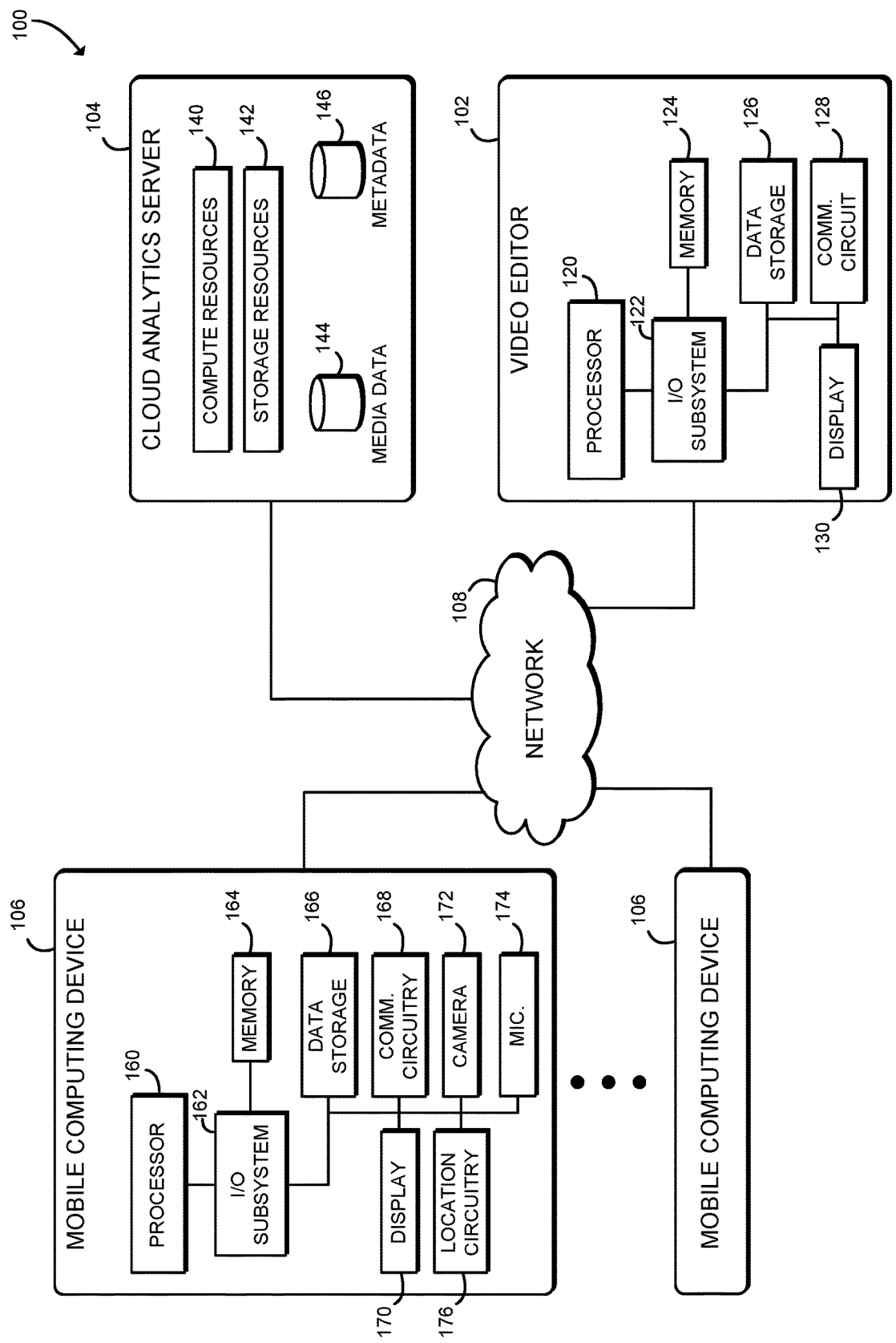
FIG. 1 is a simplified block diagram of at least one embodiment of a system for cloud video editing and multimedia search.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for cloud-enabled multimedia search and video editing includes a video editor 102, a cloud analytics server 104, and a number of mobile computing devices 106, all in communication with each other over a network 108. In use, as discussed in more detail below, the mobile computing devices 106 capture media data such as video clips, audio clips, or still images, and upload the media data to the cloud analytics server 104. The cloud analytics server 104 processes the uploaded media data, producing a searchable database of media data and related metadata. The video editor 102 edits a media program including one or more dynamic content slots. The video editor 102 builds a media query associated with each dynamic content slot and submits the media queries to the cloud analytics server 104. The media queries may include search terms based on media content and metadata, or may be based on similarity to a given sample media clip as discussed in more detail below. The video editor 102 receives search results from the cloud analytics server 104 and inserts the search results into the associated dynamic content slot when generating video output. Thus, the video editor 102 may allow for near-real-time search and incorporation of cloud-based media into a video production. Although illustrated as including one video editor 102, in some embodiments the system 100 may include any number of video editors 102 that may produce independent video output (i.e., a many-to-many-to-many relationship).

The disclosed technologies may allow a video producer to incorporate crowd-sourced content into a video production without requiring cost-prohibitive or overwhelming manual review of submitted content. Incorporation of near-real-time crowd-sourced content into a video production may allow for inclusion of unique and diverse views of notable events that could otherwise go unnoticed. Those diverse views may increase the artistic, entertainment, and informative value of video productions.

The video editor 102 may be embodied as any type of computer device for performing the functions described herein. For example, the video editor 102 may be embodied as, without limitation, a computer, a desktop computer, a workstation, a laptop computer, a notebook computer, a tablet computer, a smartphone, a distributed computing system, a multiprocessor system, a consumer electronic device, and/or any other computing device configured to perform cloud-enabled video editing. As shown in FIG. 1, the video editor 102 includes a processor 120, an input/output subsystem 122, a memory 124, a data storage device 126, a communication circuit 128, and a display 130. Of course, the video editor 102 may include other or additional components, such as those commonly found in a computer workstation (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the video editor 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the video editor 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the video editor 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store, permanently or temporarily, media data received from the cloud analytics server 104 in response to media queries.

The communication circuit 128 of the video editor 102 may be embodied as any communication circuit, device, or collection thereof, capable of enabling communications between the video editor 102, the cloud analytics server 104, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication.

The display 130 of the video editor 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled with a touch screen to facilitate user interaction.

The cloud analytics server 104 is configured to provide services including sorting and processing media data uploaded by the mobile computing devices 106. The cloud analytics server 104 may be embodied as any type of server computing device, or collection of devices, capable of performing the functions described herein. As such, the cloud analytics server 104 may be embodied as a single server computing device or a collection of servers and associated devices. For example, in some embodiments, the cloud analytics server 104 may be embodied as a "virtual server" formed from multiple computing devices distributed across the network 108 and operating in a public or private cloud. Accordingly, although the cloud analytics server 104 is illustrated in FIG. 1 and described below as embodied as a single server computing device, it should be appreciated that the video editor 102 may be embodied as multiple devices cooperating together to facilitate the functionality described below.

The cloud analytics server 104 includes compute resources 140 and storage resources 142 that may be used to process and search media data. The compute resources 140 may be embodied as physical processors, servers, virtual machines, or any other physical or virtual computing resource capable of performing the functions described herein. The cloud analytics server 104 may allocate or de-allocate compute resources 140 based on workload or other factors. The storage resources 142 may be embodied as physical storage devices, virtual disks, network servers, or any other form of data storage that may be used by the compute resources 140. In some embodiments, the storage resources 142 may be distributed among several geographical locations. Because the compute resources 140 and the storage resources 142 are scalable on demand, the cloud analytics server 104 may be known as an "elastic" cloud service provider.

The cloud analytics server 104 further includes media data 144 and metadata 146. The media data 144 is a repository for media data uploaded by the mobile computing devices 106. The metadata 146 is a repository for data related to the media data 144, for example, semantic data describing the content of the media data 144, location data associated with the media data 144, or technical information relating to the media data 144 such as the type of camera used to record the media data 144, quality information, file format information, or the like. Metadata 146 may be embedded in the media data 144, stored separately from the media data 144, or some combination of the two. The media data 144 and/or the metadata 146 may be stored using the storage resources 142 of the cloud analytics server 104, or may be stored in one or more data servers accessible by the cloud analytics server 104 over the network 108. As described above, in some embodiments, the media data 144 and/or the metadata 146 may be distributed across data servers located in multiple geographic locations.

Each of the mobile computing devices 106 is configured to capture media data and transmit the captured media data to the cloud analytics server 104. Each mobile computing device 106 may process captured media data prior to transmission to ensure the captured media data satisfies requirements of the video editor 102. Additionally, each mobile computing device 106 may include a user interface to assist a user in capturing media data desired by the video editor 102. Each mobile computing device 106 may be embodied as any type of mobile computing device capable of performing the functions described herein, including, without limitation, a computer, a smartphone, a tablet computer, a laptop computer, a notebook computer, a cellular telephone, a handset, a messaging device, a vehicle telematics device, a network appliance, a web appliance, a distributed computing system, a multiprocessor system, a processor-based system, and/or a consumer electronic device. Illustratively, a mobile computing device 106 includes a processor 160, an I/O subsystem 162, a memory 164, a data storage 166, a communication circuit 168, a display 170, and/or other components and devices commonly found in a smartphone or similar computing device. Those individual components of the mobile computing device 106 may be similar to the corresponding components of the video editor 102, the description of which is applicable to the corresponding components of the mobile computing device 106 and is not repeated herein so as not to obscure the present disclosure.

The mobile computing device 106 further includes a camera 172, a microphone 174, and location circuitry 176. The camera 172 may be embodied as a digital camera or other digital imaging device integrated with the mobile computing device 106. The camera 172 includes an electronic image sensor, such as an active-pixel sensor (APS), e.g., a complementary metal-oxide-semiconductor (CMOS) sensor, or a charge-coupled device (CCD). The camera 172 may be capable of capturing still images and/or video. The microphone 174 includes a transducer to capture audible sound waves as sound information on the mobile computing device 106. Instead of a microphone 174, in other embodiments, the mobile computing device 106 may include any sensor capable of capturing audio signals, such as a line input jack, an analog-to-digital converter (ADC), or other type of audio sensor. The microphone 174 may be capable of capturing standalone audio or, in conjunction with the camera 172, audio information for a video recording.

In the illustrative embodiment, the mobile computing device 106 includes location circuitry 176. The location circuitry 176 may be embodied as any type of sensor capable of determining the precise or approximate position of the mobile computing device 106. For example, the location circuitry 176 may be embodied as a global positioning system ("GPS") receiver, capable of determining the precise coordinates of the mobile computing device 106. In other embodiments, the location circuitry 176 may triangulate the position of the mobile computing device 106 using distances or angles to cellular network towers with known positions, provided by the communication circuit 168. In other embodiments, the location circuitry 176 may determine the approximate position of the mobile computing device 106 based on association to wireless networks with known positions, using the communication circuit 168.

As discussed in more detail below, the video editor 102, the cloud analytics server 104, and the mobile computing devices 106 are configured to transmit and receive data with the other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications among the devices of the system 100.

Figure 2:
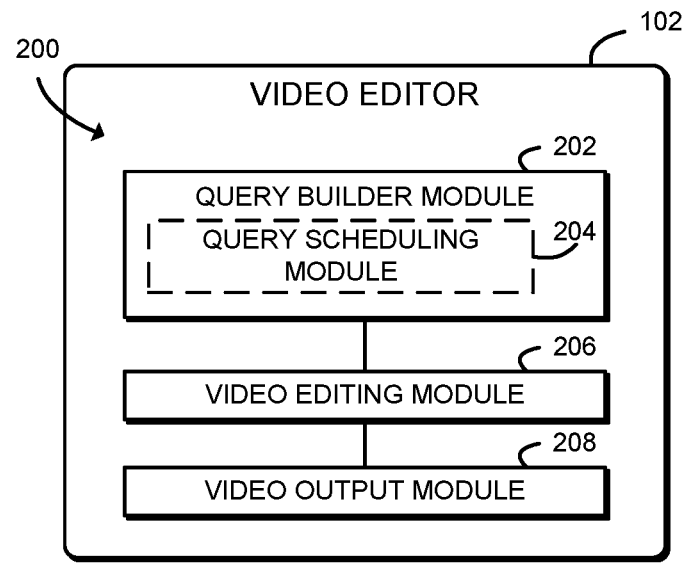
FIG. 2 is a simplified block diagram of at least one embodiment of an environment of a video editor of the system of FIG. 1.

Referring now to FIG. 2, in one embodiment, the video editor 102 establishes an environment 200 during operation. The illustrative environment 200 includes a query builder module 202, a video editing module 206, and a video output module 208. The various modules of the environment 200 may be embodied as hardware, firmware, software, or a combination thereof.

The query builder module 202 is configured to build media queries based on selections received from a user of the video editor 102. Each media query may be used to dynamically search for media information stored and/or indexed by the cloud analytics server 104. Each media query may be embodied as a set of query parameters selected by the user, including metadata query parameters, media query parameters, and sample media query parameters, as described below. The media query may be submitted to the cloud analytics server 104 to be run immediately, or scheduled in advance to run at a later date and time. In some embodiments, those functions may be performed by sub-modules, for example, by a query scheduling module 204.

The video editing module 206 is configured to manage and edit a media program including dynamic content slots. The video editing module 206 may provide a timeline interface to the media program, allowing the user to lay out pre-programmed media and dynamic content slots. The video editing module 206 associates media queries built by the query builder module 202 with dynamic content slots of the media program.

The video output module 208 is configured to render the media program produced by the video editing module 206 into a video output in a suitable format. The video output may include a video data file, a video data stream, or a video stream suitable for live broadcast. The video output module 208 incorporates media data received from the cloud analytics server 104 in response to the media query into the video output at the associated dynamic content slot.

Figure 3:
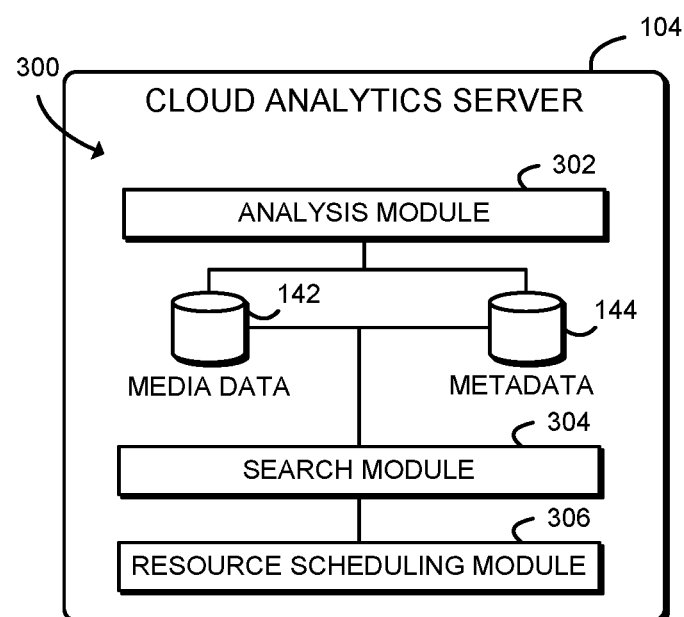
FIG. 3 is a simplified block diagram of at least one embodiment of an environment of a cloud analytics server of the system of FIG. 1.

Referring now to FIG. 3, in one embodiment, the cloud analytics server 104 establishes an environment 300 during operation. The illustrative environment 300 includes an analysis module 302, a search module 304, and a resource scheduling module 306. The various modules of the environment 300 may be embodied as hardware, firmware, software, or a combination thereof.

The analysis module 302 is configured to receive media data 144 uploaded from the mobile computing devices 106 and analyze the media data 144 to allow for searching. The analysis module 302 may perform any analysis on the media data that may facilitate searching; for example, the analysis module 302 may perform facial detection, object detection, text recognition, color balance and saturation analysis, and audio tune analysis. The analysis module 302 may also evaluate the focus, stability, exposure, or lighting of the media data 144, determine whether the media data 144 includes audio, and evaluate image data for motion. The analysis module 302 may store the results of analysis in the metadata 146.

The search module 304 is configured to search the media data 144 based on a media query received from the video editor 102 and return the search results. As described above, the media query may be based on metadata query parameters, media query parameters, or sample media query parameters. The search module 304 may search against the media data 144, the metadata 146, or any combination of the two.

The resource scheduling module 306 is configured to schedule compute resources 140 and/or storage resources 142 based on requests received from the video editor 102. For example, the resource scheduling module 306 may pre-allocate compute resources 140 and/or storage resources 142 in anticipation of receiving a large amount of uploaded media data near the scheduled date of a media query. Similarly, the resource scheduling module 306 may pre-allocate compute resources 140 and/or storage resources 142 that are geographically close to the scheduled location of the media query. In some embodiments, the resource scheduling module 306 may schedule resources automatically based on the media query.

Figure 4:
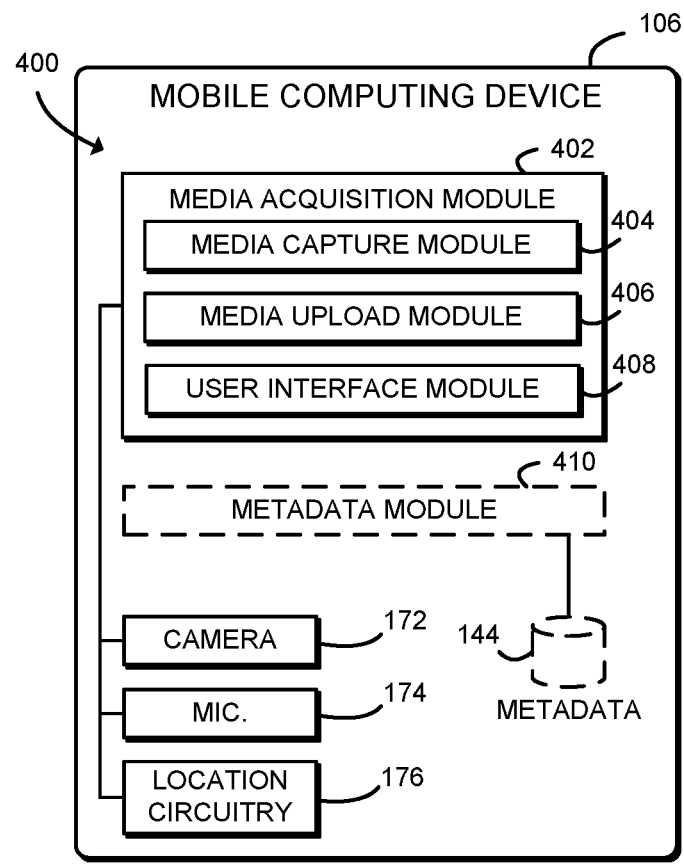
FIG. 4 is a simplified block diagram of at least one embodiment of an environment of a mobile computing device of the system of FIG. 1.

Referring now to FIG. 4, in one embodiment, each mobile computing device 106 establishes an environment 400 during operation. The illustrative environment 400 includes a media acquisition module 402 and in some embodiments may include a metadata module 410. The various modules of the environment 400 may be embodied as hardware, firmware, software, or a combination thereof.

The media acquisition module 402 is configured to capture media data 144 using sensors of the mobile computing device 106 such as the camera 172 and microphone 174. The media acquisition module 402 is further configured to upload captured media data 144 to the cloud analytics server 104. In some embodiments, the media acquisition module 402 may process the captured media data 144 prior to uploading, to ensure that an acceptance policy created by the video editor 102 has been satisfied. The media acquisition module 402 is further configured to present a user interface to facilitate capturing media data 144. The user interface may provide instructions or other assistance to ensure captured media data 144 satisfies the acceptance policy of the video editor 102. In some embodiments, those functions may be performed by sub-modules, for example, by a media capture module 404, a media upload module 406, or a user interface module 408.

In some embodiments, the metadata module 410 is configured to embed metadata 146 into the captured media data 144 prior to upload. The metadata 146 may include technical attributes of the mobile computing device 106 or its components such as the camera 172 or the microphone 174. The metadata 146 may include technical attributes of the captured media data 144, such as exposure, focus, aperture, or shutter settings. The metadata 146 may include location information, for example GPS coordinates provided by the location circuitry 176. In some embodiments, the metadata 146 may include information provided by other sensors of the mobile computing device 106, for example, information on altitude, motion, temperature, compass direction, or spatial orientation. Additionally, in some embodiments, the metadata 146 may include metadata entered by the user, for example tags, labels, or other annotations.

Figure 5:
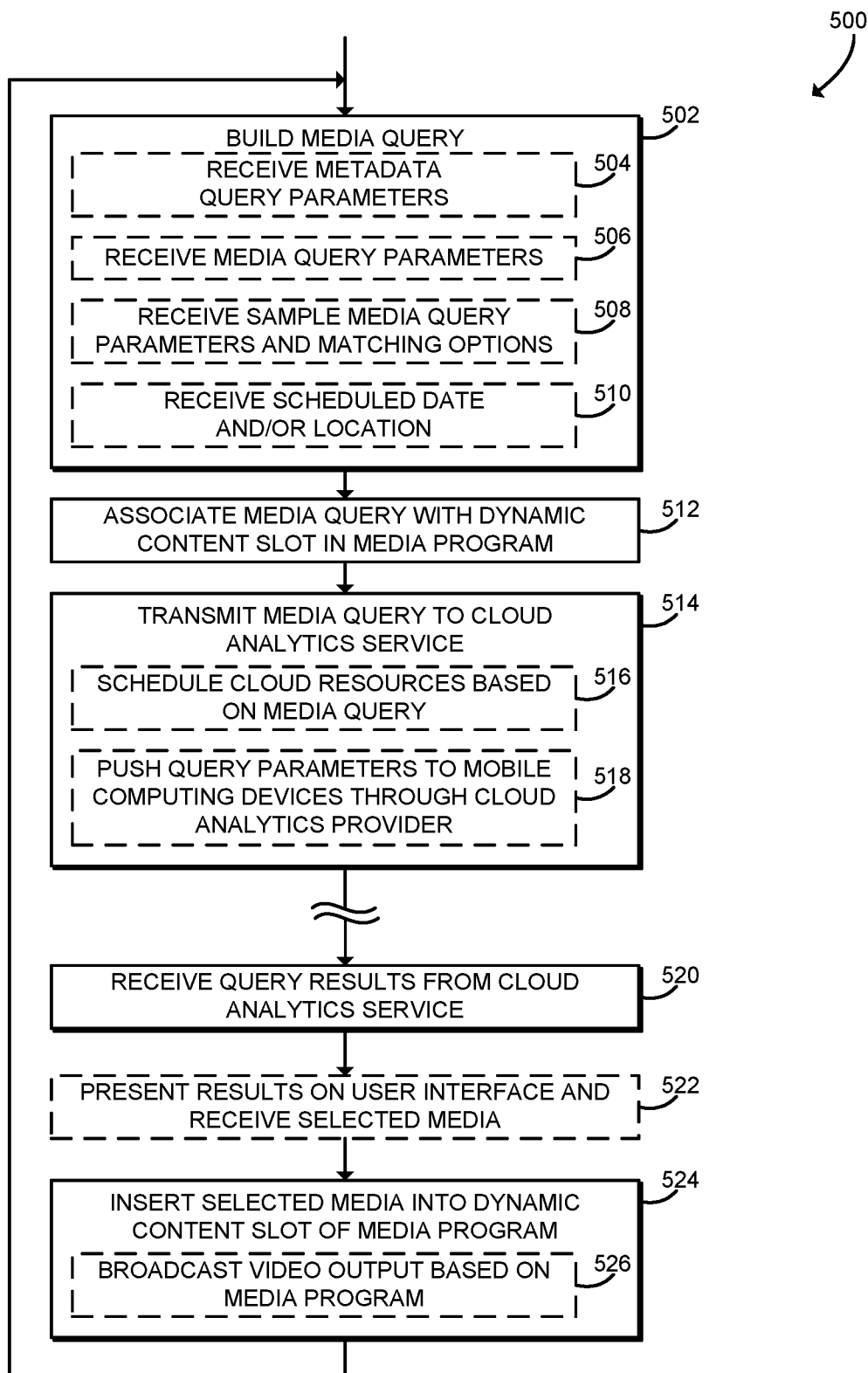
FIG. 5 is a simplified flow diagram of at least one embodiment of a method for cloud-enabled video editing that may be executed by a video editor of FIGS. 1 and 2.
Figure 6:
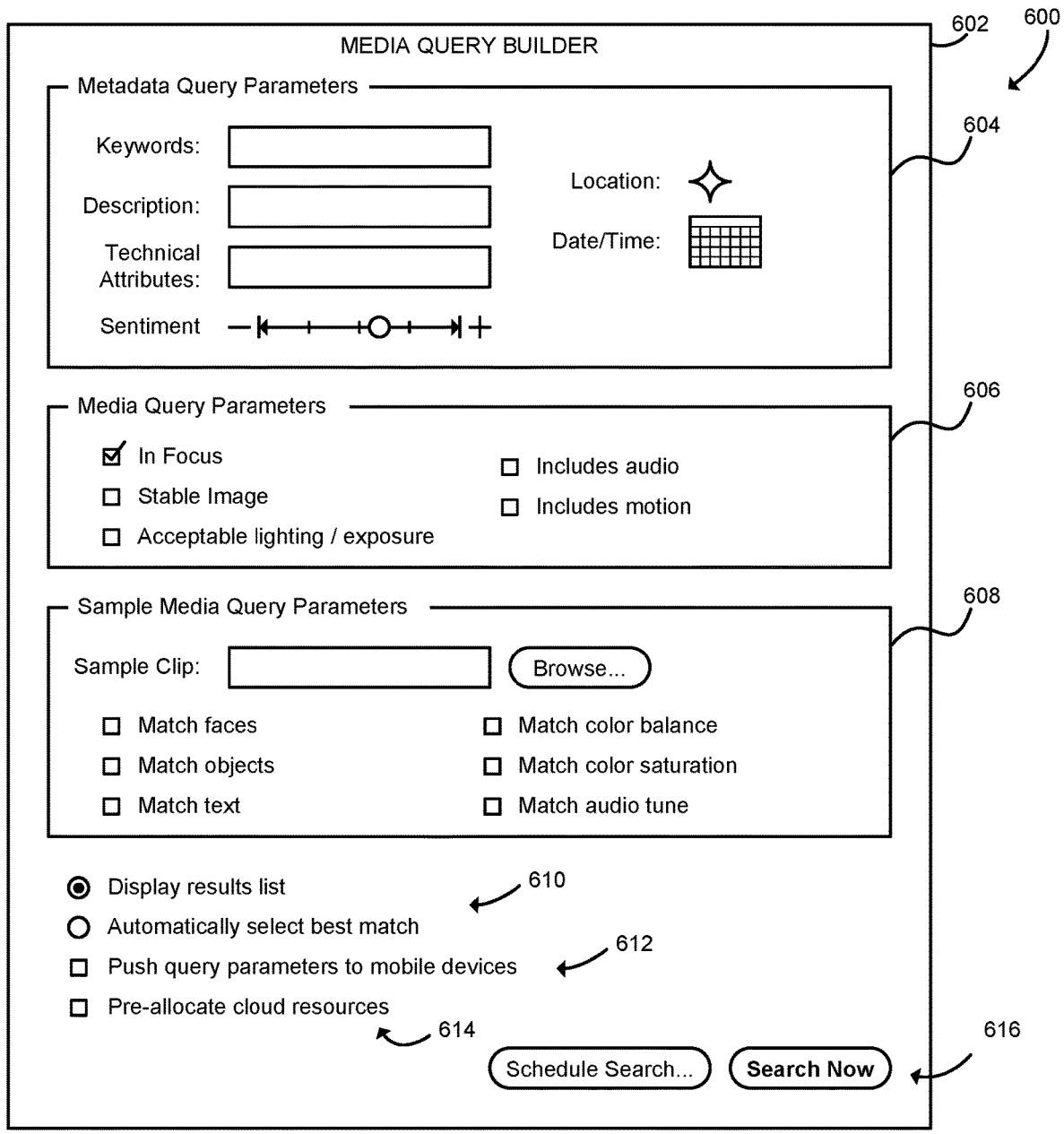
FIG. 6 is a simplified block diagram of at least one embodiment of a media query builder that may be provided by the video editor of FIGS. 1 and 2.

Referring now to FIG. 5, in use, the video editor 102 may execute a method 500 for cloud-enabled video editing. The method 500 begins with block 502, in which the video editor 102 builds a media query based on query parameters selected by the user of the video editor 102. The video editor 102 may present a user interface to allow the user to configure the media query. For example, referring to FIG. 6, diagram 600 illustrates one embodiment of a media query builder 602. The control groups 604, 606, 608 of the media query builder 602 illustrate potential query parameters that may be selected by the user.

Referring back to FIG. 5, in block 504, in some embodiments, the video editor 102 receives metadata-based query parameters from the user. Metadata-based query parameters may be used to search indexed description data of the metadata 146 that is related to the media data 144, but not necessarily embodied in the content of the media data 144. For example, as illustrated in control group 604 of FIG. 6, metadata-based queries may be based on search keywords, plaintext description, technical metadata attributes, a sentiment factor, location, or date and time. Search keywords and plaintext description may be associated manually with the media data 144, or may be associated through automated analysis by the cloud analytics server 104. Technical metadata attributes, for example white balance settings, frame rate, shutter settings, aperture settings, and the like, may be supplied by the mobile computing device 106 at the time of capture. The sentiment factor may be assigned algorithmically by the cloud analytics server 104 based on content analysis of the media data 144, or may be derived from public input. Location and date/time information may also be supplied by the mobile computing device 106 at the time of capture.

Referring back to FIG. 5, in block 506, in some embodiments, the video editor 102 receives content-based media query parameters from the user. Media query parameters may be used to search information derived through analysis of the media data 144 itself. Such analysis may be performed by the cloud analytics server 104 ahead of time, to improve search performance. For example, as illustrated in control group 606 of FIG. 6, media queries may be based on focus, stability, lighting or exposure, audio, or motion. Focus and stability may be used to restrict the search to media clips that are in-focus and stable, that is, media clips captured without excessive camera shaking. Lighting and exposure may restrict the search to media clips captured under appropriate lighting conditions. As an example, audio may be used to return only media clips including an audio track. As another example, motion may be used to return only media clips with motion detected, for example media including physical gestures, media panning across a scene, or media including moving objects within a scene. As another example, media queries may be based on gestures detected within the media clips. Such media query parameters may be used by the video editor 102 to restrict the search to media clips having desirable quantities and to exclude media clips unsuitable for use in the output video.

In block 508 of the method 500 of FIG. 5, in some embodiments, the video editor 102 receives a sample media query parameter and associated matching options from the user. The sample media may be used to search for similar media clips given a stock media clip as a reference. The cloud analytics server 104 may process the sample media similarly to the media data 144, and use the processing results as a basis for comparison. For example, as illustrated in control group 608 of FIG. 6, sample media queries may include options to match media clips based on facial recognition, object recognition, text recognition, color balance, color saturation, or audio tune. The video editor 102 may supply a sample media clip including an image of a person's face, e.g., a celebrity or newsworthy individual. Facial recognition may search for media clips also including that person's face. Similarly, the sample media clip may include images of a particular object or written text that may be the basis for a search. Color balance and color saturation matching may be used to search for media clips containing similar color balance and/or color saturation. Matching colors may allow the resulting media clips to fit in well with the rest of the media program.

Referring back to FIG. 5, in block 510, in some embodiments, the video editor 102 may receive a scheduled date and/or location for the media query. As illustrated by control group 616 of FIG. 6, in some embodiments the user of the video editor 102 may schedule the search for a future time, or may submit the search immediately. The scheduled date and/or location may correspond to a future broadcast or live performance of the media program. As described below, the scheduled date may be used to coordinate the compute resources 140 and/or the storage resources 142 of the cloud analytics server 104. Additionally, in some embodiments, the location for the media query may be fine grained and may include orientation information, allowing selection of media from particular viewpoints of a large event. For example, the location may specify locations and viewing angles in a stadium used for a live sporting event. Thus, the media query may build a panoramic view of an event from multiple view points.

Figure 7:
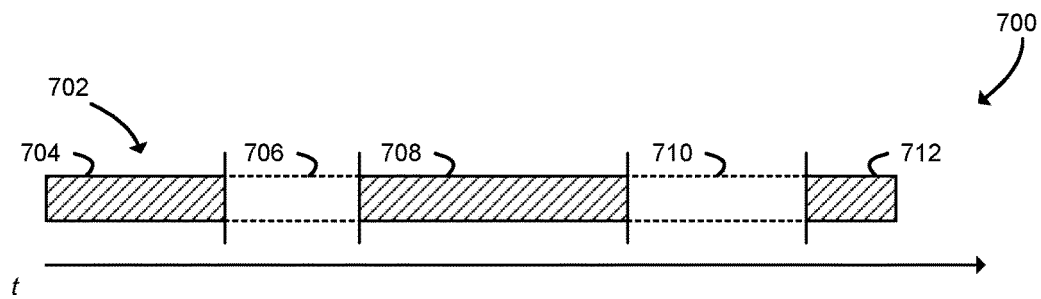
FIG. 7 is a simplified schematic diagram of a media program produced by the video editor of FIGS. 1 and 2.

In block 512 of the method 500 of FIG. 5, after building the media query, the video editor 102 associates the media query with a dynamic content slot in the media program. The dynamic content slot represents a portion of the media program that will be replaced with dynamic content as the video output is generated. For example, referring to FIG. 7, diagram 700 illustrates a media program 702. The media program 702 includes three pre-programmed content segments 704, 708, 712. Dynamic content slots 706, 710 are positioned between the pre-programmed content segments 704, 708, 712. Each dynamic content slot 706, 710 has a duration and an associated media query. In a user interface of the video editor 102, each dynamic content slot 706, 710 may be represented with an icon derived from the media query, such as a thumbnail representation of a sample media clip. For example, when producing a news program on a hurricane, the content segment 704 may include a news anchor introduction. The dynamic content slot 706 may be associated with a media query based on the time and location of the hurricane, searching for severe weather and evacuation. Stock footage of a hurricane may be provided as a sample media clip. Content segment 708 may be a pre-recorded correspondent segment. Dynamic content slot 710 may include a media query based on the location of the hurricane, searching for themes of recovery and hope. Content segment 712 may include a news anchor conclusion.

Referring back to FIG. 5, in block 514, the video editor 102 transmits the media query to the cloud analytics server 104. As described above, the media query may be submitted for immediate evaluation and search, or may be submitted for evaluation and search at a scheduled time. In some embodiments, in block 516, the video editor 102 may request scheduling of cloud resources of the cloud analytics server 104 based on the scheduled query. For example, the user of the video editor 102 may anticipate a large number of media submissions associated with the date and location of a live event. Accordingly, the video editor 102 may request that the cloud analytics server 104 pre-allocate compute resources 140 to be available at the date or location of the scheduled query. In such example, the cloud analytics server 104 may prepare additional virtual machines on the date of the scheduled query, or move virtual machines to a cloud datacenter near the location of the scheduled query. Additionally, or alternatively, the video editor 102 may request the cloud analytics server 104 to pre-allocate storage resources 142 based on the date and location of the scheduled query. Scheduling of cloud resources may be requested based on a user selection, for example, the checkbox 614 of FIG. 6.

In some embodiments, in block 518 of the method 500 of FIG. 5, the video editor 102 may request that the query parameters of the media query be pushed by the cloud analytics server 104 to the mobile computing devices 106. Some or all of the query parameters may represent an acceptance policy of the video editor 102; that is, the video editor 102 may only accept media clips satisfying those query parameters. In such embodiments, the mobile computing devices 106 may apply the query parameters of the acceptance policy to captured media clips prior to uploading to the cloud analytics server 104. By applying query parameters before uploading media clips, the quality of uploaded media clips may be improved, and the processing required by the cloud analytics server 104 may be reduced. As illustrated by checkbox 612 of FIG. 6, the video editor 102 may select to push all query parameters to the mobile computing devices 106. In other embodiments, the video editor 102 may select a subset of the query parameters to be pushed to the mobile computing devices 106; for example, media clip format and resolution requirements.

Some time after transmitting the media query, in block 520 the video editor 102 receives query results from the cloud analytics server 104. The query results identify media clips generated by mobile computing devices 106 that satisfy the query parameters of the media query. The query results may be sorted in order of relevance, date created, or otherwise. In some embodiments, the query results may include a reference to matching media clips. In other embodiments, the query results may include the media data 144 for the matching media clips.

In some embodiments, in block 522, the video editor 102 may present the search results to the user through a user interface. The user may provide a selection indicating the desired media clip. For example, in some embodiments the video editor 102 may present a list of the top three to five search results, including thumbnails or other representations of the matching media clips, on the display 130 of the video editor 102. The user may be able to quickly select a desired clip from among the search results. In other embodiments, rather than presenting the search results to the user, the video editor 102 may automatically select a search result without further direction from the user, for example, the best-matching search result. The video editor 102 may determine whether or not to display the search results based on a selection from the user, for example, as illustrated by radio button group 610 of FIG. 6.

In block 524, the video editor 102 outputs the selected media clip into the associated dynamic content slot of the media program. As described above, the selected media clip may be selected by the user through a user interface, or may be selected automatically. In block 526, in some embodiments, the video editor 102 inserts the selected media clip into a video output generated based on the media program. The video editor 102 may render the video output to an output media file suitable for later playback. In some embodiments, the video editor 102 may render video output that is immediately or nearly immediately transmitted to a video device of a video consumer. For example, the video editor 102 may produce a live video stream that is broadcast over television, or streamed to video consumers over the network 108. After generating the video output, the method 500 loops back to block 502 to continue building media queries.

Figure 8:
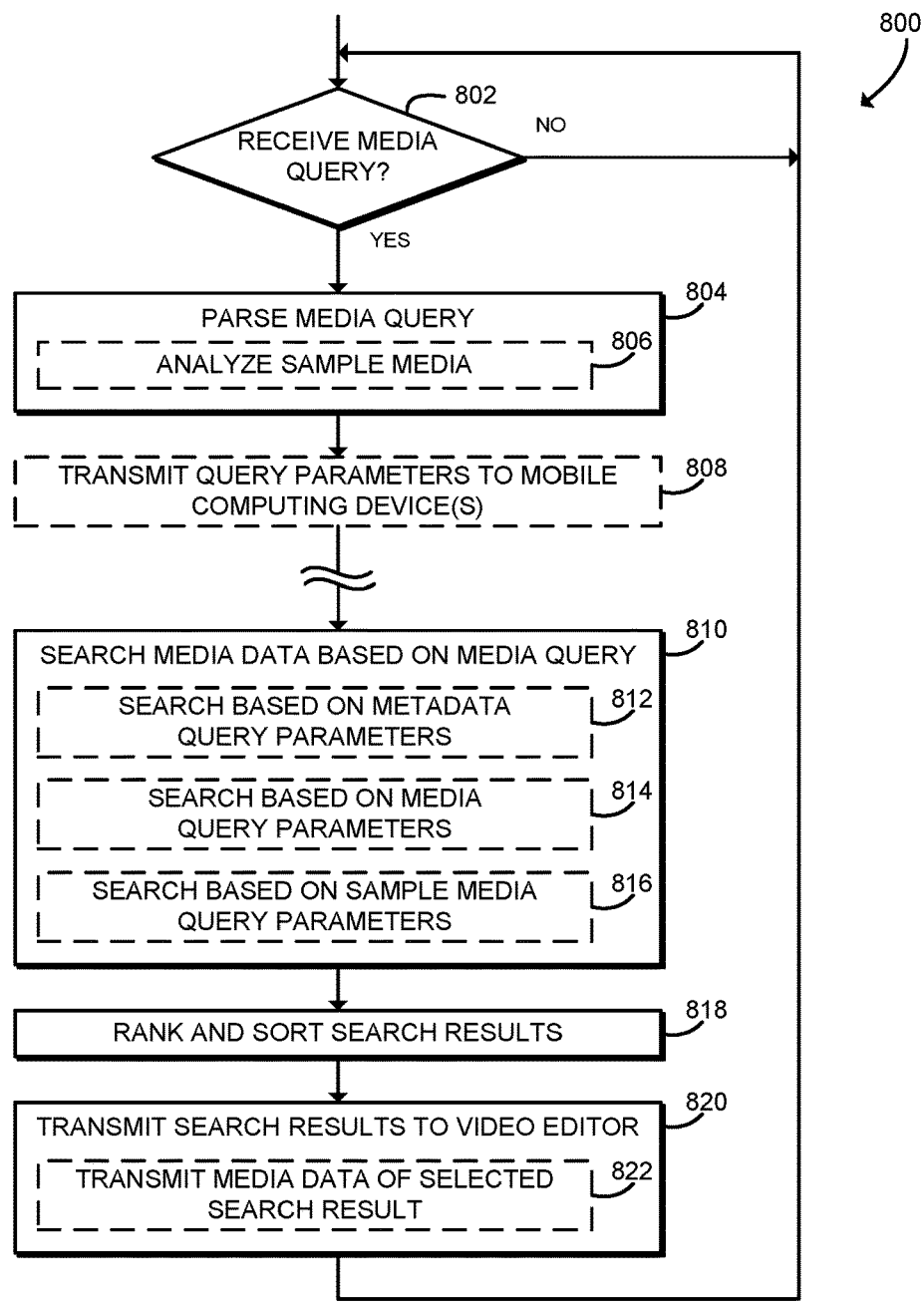
FIG. 8 is a simplified flow diagram of at least one embodiment of a method for cloud-enabled multimedia search that may be executed by a cloud analytics server of FIGS. 1 and 3.

Referring now to FIG. 8, in use, the cloud analytics server 104 may execute a method 800 for receiving and processing media queries from the video editor 102. The method 800 begins with block 802, in which the cloud analytics server 104 determines whether a media query has been received from the video editor 102. If not, the method 800 loops back to continue waiting for media queries in block 802. If so, the method 800 advances to block 804.

In block 804, the cloud analytics server 104 parses the media query received from the video editor 102. The cloud analytics server 104 may interpret and evaluate each query parameter of the media query. In some embodiments, in block 806, the cloud analytics server 104 may analyze a sample media clip supplied with the media query. The cloud analytics server 104 may perform the same analysis on the sample media clip as is performed on media clips submitted by the mobile computing devices 106, as described below in connection with FIG. 9.

In some embodiments, in block 808, the cloud analytics server 104 may transmit query parameters of the media query to the mobile computing devices 106. For example, in some embodiments, the cloud analytics server 104 may maintain a list of mobile computing devices 106 and may push the query parameters to each. In some embodiments, the cloud analytics server 104 may store the query parameters and supply the query parameters to the mobile computing devices 106 when requested. Additionally, although illustrated as occurring in block 808, in other embodiments the cloud analytics server 104 may provide the query parameters to the mobile computing devices 106 at other times.

After some time, in block 810 the cloud analytics server 104 searches the media data 144 based on the media query. The cloud analytics server 104 may perform such search using the metadata 146, or by directly analyzing the media data 144. In some embodiments, in block 812, the cloud analytics server 104 searches the media data 144 based on metadata query parameters of the media query. For example, as described above in connection with FIG. 5, metadata query parameters may include search keywords, plaintext description, technical metadata attributes, a sentiment factor, location, or date and time. In some embodiments, in block 814, the cloud analytics server 104 searches the media data 144 based on media query parameters. For example, as described above in connection with FIG. 5, the media query parameters may be based on focus, stability, lighting or exposure, audio, or motion of the media data 144 itself. In some embodiments, in block 816, the cloud analytics server 104 searches the media data 144 based on sample media query parameters. For example, as described above in connection with FIG. 5, the sample media query parameters may include a sample media clip and matching options based on facial recognition, object recognition, text recognition, color balance, color saturation, or audio tune.

After searching the media data 144, in block 818, the cloud analytics server 104 ranks and sorts the search results. The cloud analytics server 104 may rank the search results based on the best match to the media query, the date of the media clip, or any other ranking criteria. In block 820, the cloud analytics server 104 transmits the search results to the video editor 102. In some embodiments, the cloud analytics server 104 may send a list of top-ranked search results. In other embodiments, the cloud analytics server 104 may send a single search result. In some embodiments, in block 822 the cloud analytics server 104 transmits the media data 144 of a selected media clip. As described above in connection with FIG. 5, the selected media clip may be the single top-ranked media clip, or may be a media clip selected by the user of the video editor 102. After transmitting the search results, the method 800 loops back to block 802 to continue waiting for additional media queries.

Figure 9:
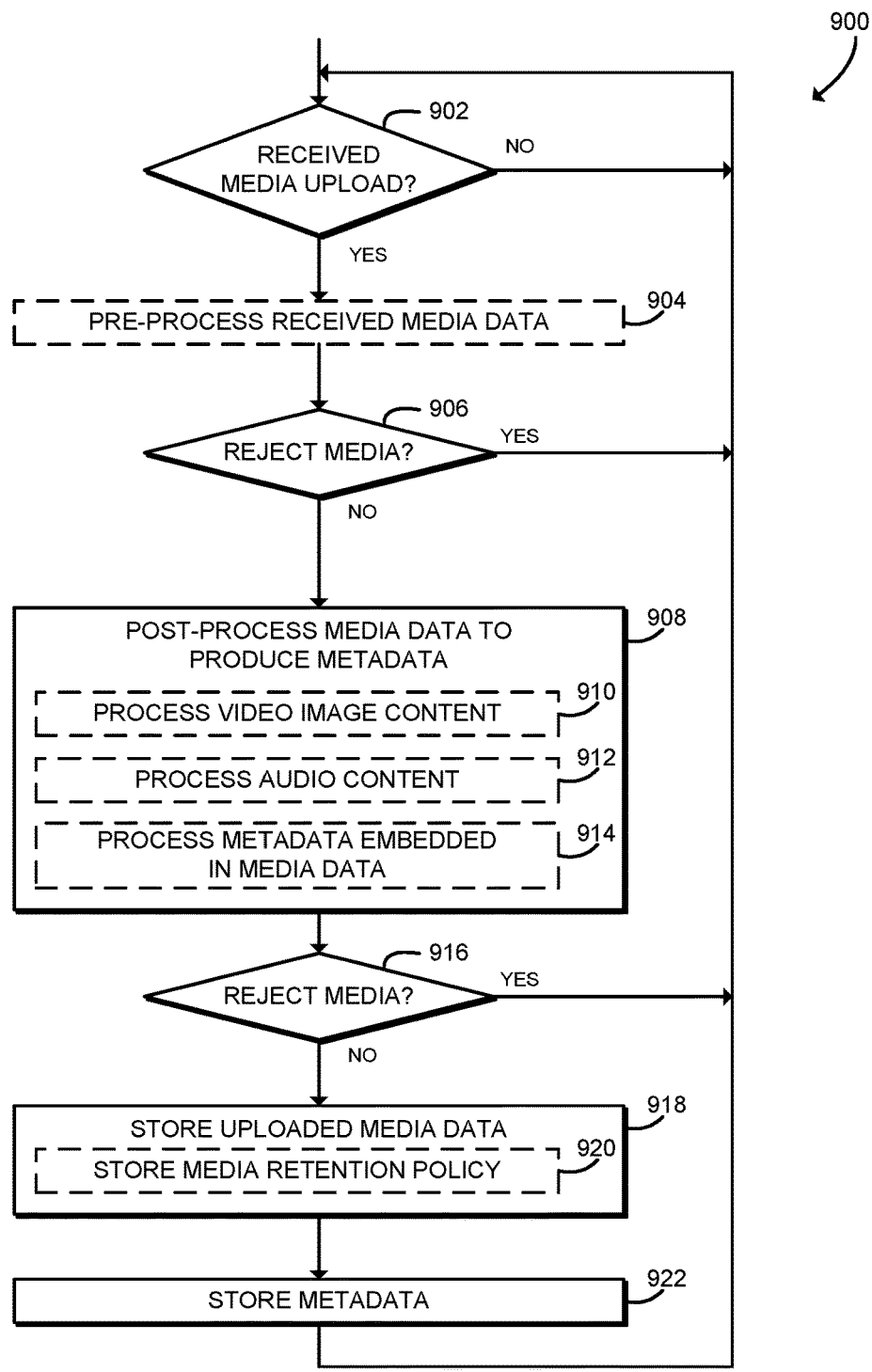
FIG. 9 is a simplified flow diagram of at least one embodiment of a method for cloud-enabled multimedia storage and analysis that may be executed by the cloud analytics server of FIGS. 1 and 3.

Referring now to FIG. 9, in use, the cloud analytics server 104 may execute a method 900 for receiving and processing media clips from the mobile computing devices 106. The method 900 begins with block 902, in which the cloud analytics server 104 determines whether a media clip upload has been received from a mobile computing device 106. If not, the method 900 loops back to continue waiting for media clip uploads in block 902. If so, the method 900 advances to block 904.

In some embodiments, in block 904, the cloud analytics server 104 pre-processes media data 144 received from a mobile computing device 106. In some embodiments, such pre-processing may be embodied as any analysis or evaluation of the media data that may be performed quickly and without using excessive compute resources 140. For example, pre-processing may be embodied as evaluating metadata 146 or format data associated with the media data 144. In such example, the cloud analytics server 104 may evaluate a source location associated with the media data 144, a media format of the media data 144, or a resolution of the media data 144. In other embodiments, pre-processing may include evaluating capabilities of the mobile computing device 106. For example, the cloud analytics server 104 may evaluate the processing capabilities or available network bandwidth of the mobile computing device 106. Information on capabilities of the mobile computing device 106 may be received with the media data 144, as described below in connection with FIG. 10.

In block 906, the cloud analytics server 104 determines whether to reject the uploaded media data 144. The cloud analytics server 104 may reject the media data 144 based on the results of the pre-processing of block 904. Criteria for rejection may be based on one or more media queries that have been received from the video editor 102. For example, the cloud analytics server 104 may reject media data 144 that is not from a particular source location, that is supplied in an incorrect format, or that does not have a required resolution. In some embodiments, the cloud analytics server 104 may reject media data 144 from mobile computing devices 106 that do not have desired capabilities; for example, mobile computing devices 106 with insufficient processing power or network bandwidth. Rejecting media data 144 prior to extensive processing may conserve compute resources 140 and/or reduce the amount of media data 144 and metadata 146 that must be stored in the storage resources 142. If the cloud analytics server 104 determines to reject the media data 144, the method 900 loops back to block 902 to continue waiting for media uploads. If the cloud analytics server 104 determines not to reject the media data 144, the method 900 advances to block 908.

In block 908, the cloud analytics server 104 post-processes the uploaded media data 144. Post-processing may include computing-resource-intensive calculations performed on the media data 144. Such post-processing may be scheduled or distributed among the compute resources 140 of the cloud analytics server 104. Results of post-processing may be indexed or stored in the metadata 146, to improve search performance. In some embodiments, in block 910 the cloud analytics server 104 processes video image content of the uploaded media data 144. That image analysis may be used to evaluate query parameters received from the video editor 102. For example, the cloud analytics server 104 may analyze the media clip to determine whether it is in focus, determine whether the camera is stable, determine lighting or exposure information, or determine whether the media clip includes motion. The cloud analytics server 104 may further perform facial detection analysis, object detection analysis, optical character recognition and other text recognition analysis, and analysis of image color and saturation. In some embodiments, in block 912, the cloud analytics server 104 analyzes the audio content of the uploaded media data 144. Again, that audio analysis may be used to evaluate query parameters received from the video editor 102. For example, the cloud analytics server 104 may determine whether the media data 144 includes audio information, and may perform audio tune analysis of the media data 144. Audio tune analysis may include identifying musical tones in the audio data as well as determining how closely the audio data matches a musical tone. In some embodiments, in block 914, the cloud analytics server 104 may process metadata 146 embedded in the uploaded media data 144. That metadata analysis may be used to evaluate query parameters. For example, the cloud analytics server 104 may evaluate location coordinates embedded in the media data 144 or may evaluate technical attributes of the recording device that are embedded in the media data 144.

In block 916, the cloud analytics server 104 determines whether to reject the uploaded media data 144. The cloud analytics server 104 may reject the media data 144 based on the results of the post-processing of block 916, as well as any result from pre-processing of block 904. As described above in connection with block 906, criteria for rejection may be based on one or more media queries that have been received from the video editor 102. The uploaded media data 144 may be rejected after post-processing to store only media data 144 that satisfies a media query, or to prevent storage of cumulative media data 144. If the cloud analytics server 104 determines to reject the media data 144, the method 900 loops back to block 902 to continue waiting for additional uploaded media data 144. If the cloud analytics server 104 determines not to reject the media data 144, the method 900 advances to block 918.

In block 918, the cloud analytics server 104 stores the uploaded media data 144. As described above in connection with FIG. 5, storage resources 142 for the media data 144 may be pre-allocated based on a scheduled date and location of a media query. For example, storage resources 142 may be located in a datacenter geographically close to a scheduled live event. In some embodiments, in block 920 the cloud analytics server 104 stores a media retention policy associated with the media data 144. The media retention policy may dictate how long the media data 144 is stored and when the media data 144 is deleted. For example, the media retention policy may dictate that the media data 144 be deleted some time after the scheduled date of a media query. Thus, the media retention policy may conserve storage resources 142 of the cloud analytics server 104. In block 922, the cloud analytics server 104 stores metadata 146 associated with the uploaded media data 144. As described above, the metadata 146 may be searched to return associated media data 144 as a search result to the video editor 102. After storing the media data 144 and the metadata 146, the method 900 loops back to 902 to continue waiting for uploaded media data 144.

Figure 10:
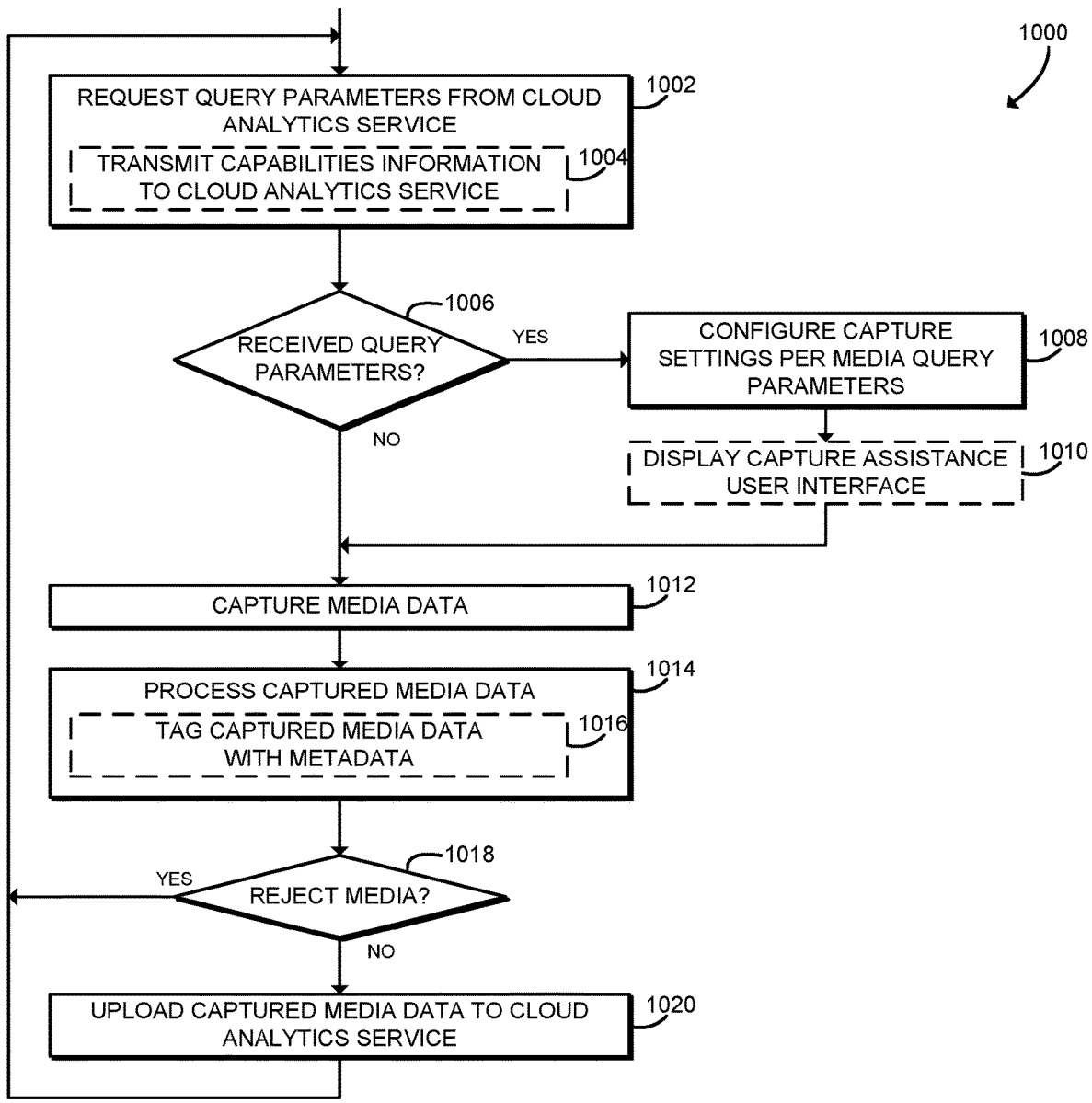
FIG. 10 is a simplified flow diagram of at least one embodiment of a method for cloud-enabled multimedia capture that may be executed by a mobile computing device of FIGS. 1 and 4.

Referring now to FIG. 10, in use, a mobile computing device 106 may execute a method 1000 for capturing media clips and uploading the media clips to the cloud analytics server 104. The method 1000 begins with block 1002, in which the mobile computing device 106 requests query parameters from the cloud analytics server 104. The query parameters derive from the media query produced by the video editor 102. The received query parameters thus represent an acceptance policy describing media data 144 that could be provided to the video editor 102. Although illustrated as requesting the query parameters from the cloud analytics server 104, in some embodiments, the cloud analytics server 104 may push query parameters to the mobile computing device 106 without a request. In some embodiments, in block 1004, the mobile computing device 106 may transmit capabilities information to the cloud analytics server 104. As described above, the capabilities information may include information describing the processing capability of the mobile computing device 106 or concerning available network bandwidth.

In block 1006, the mobile computing device 106 determines whether query parameters have been received from the cloud analytics server 104. If not, the method 1000 advances to block 1012, as described below. If so, the method 1000 branches to block 1008.

In block 1008, the mobile computing device 106 configures media capture settings based on the query parameters. By configuring capture settings, the mobile computing device 106 may ensure that captured media data 144 is usable by the video editor 102 prior to capturing. For example, the mobile computing device 106 may configure media format, resolution, lighting, or exposure settings according to query parameters. Those query parameters are derived from the media query produced by the video editor 102.

In some embodiments, in block 1010 the mobile computing device 106 displays a media capture assistance user interface based on the query parameters. The media capture assistance user interface may be embodied as words or symbols displayed on the display 170 of the mobile computing device 106. For example, the mobile computing device 106 may display textual instructions based on the query parameters. Continuing that example, the query parameters may include a search for a person smiling and waving at the camera. In that example, the mobile computing device 106 may prompt the user to direct the subject to smile and wave at the camera. In another example, the query parameters may indicate that only in-focus, stable images will be accepted. In that example, the mobile computing device 106 may display text or symbols directing the user to correct focus or stability problems. After block 1010, the method 1000 advances to block 1012.

In block 1012, the mobile computing device 106 captures media data 144. The mobile computing device 106 may capture video clips, audio clips, still images, or any other media data 144. Media capture may be initiated by a user interface interaction or automatically without further direction from the user.

In block 1014, the mobile computing device 106 processes the captured media data 144. Processing may be minimal, such as converting the captured media data 144 to an appropriate file format, or involved, such as performing content analysis such as facial recognition, object detection, audio tune analysis, or the like. The extent of processing performed by the mobile computing device 106 may depend on the capabilities of the mobile computing device 106. In some embodiments, in block 1016 the mobile computing device 106 tags the captured media data 144 with metadata 146. The metadata 146 may include technical information identifying the mobile computing device 106 or providing capture information such as white balance, exposure, aperture, image quality attributes, or similar. In some embodiments, the metadata 146 may include location information. For example, the metadata 146 may include GPS coordinates provided by the location circuitry 176.

In block 1018, the mobile computing device 106 determines whether to reject the captured media data 144. The mobile computing device 106 applies the received query parameters to the captured media data 144 to determine whether the acceptance policy of the video editor 102 has been satisfied. In many embodiments, no captured media data 144 will be rejected, because the media capture settings were correctly set in block 1008 based on the query parameters. In some embodiments, the media data 144 may be rejected based on processing performed in block 1016. For example, media data 144 may be rejected if facial recognition technology has not identified any faces in the captured media data 144. Rejection of media data 144 by the mobile computing device 106 may reduce demand on the compute resources 140 of the cloud analytics server 104. Of course, if no query parameters have been received by the mobile computing device 106, no captured media data 144 may be rejected. If the mobile computing device 106 determines to reject the captured media data 144, the method 1000 loops back to block 1002 to continue capturing media data 144. If the mobile computing device 106 determines not to reject the captured media data 144, the method 1000 advances to block 1020. In block 1020, the mobile computing device 106 uploads the captured media data 144 to the cloud analytics server 104. After upload, the method 1000 loops back to block 1002 to continue capturing media data 144.

EXAMPLES

Illustrative examples of the technologies disclosed herein are provided below. An embodiment of the technologies may include any one or more, and any combination of, the examples described below.

Example 1 includes a video editor comprising a query builder module to build a media query including a query parameter selected by a user of the video editor; a video editing module to associate the media query with a dynamic content slot of a media program; transmit the media query to a cloud analytics service; and receive query results from the cloud analytics service in response to the media query, the query results to identify a media clip produced by a mobile computing device; and a video output module to generate a video output based on the media program, the video output to include the media clip identified in the query results inserted in the dynamic content slot.

Example 2 includes the subject matter of Example 1, and wherein the media clip comprises at least one of: a video clip, an audio clip, or a still image produced by the mobile computing device.

Example 3 includes the subject matter of any of Examples 1 and 2, and wherein to generate the video output comprises to automatically insert the media clip identified in the query results into the dynamic content slot without direction from the user.

Example 4 includes the subject matter of any of Examples 1-3, and wherein the video editing module is further to present a user interface including the query results; and receive a user selection of a selected media clip identified in the query results; wherein to generate the video output comprises to generate the video output including the selected media clip inserted in the dynamic content slot.

Example 5 includes the subject matter of any of Examples 1-4, and wherein the video editing module and the video output module are to receive the query results and to generate the video output contemporaneously with each other.

Example 6 includes the subject matter of any of Examples 1-5, and wherein to generate the video output comprises to transmit the video output to a video device of a video consumer.

Example 7 includes the subject matter of any of Examples 1-6, and wherein the query parameter comprises at least one of: (i) a metadata query parameter to search description data associated with the media data, (ii) a media query parameter to search content data derived from the media data, or (iii) a sample media query parameter based on a sample media clip selected by the user.

Example 8 includes the subject matter of any of Examples 1-7, and wherein the media query parameter comprises a media query parameter selected from: a keyword, embedded metadata produced by the mobile computing device, a sentiment factor, a location, or a date.

Example 9 includes the subject matter of any of Examples 1-8, and wherein the media query parameter comprises a media query parameter selected from: an in-focus requirement, a stability requirement, a lighting requirement, an audio information requirement, or a motion requirement.

Example 10 includes the subject matter of any of Examples 1-9, and wherein the sample media query parameter comprises a sample media query parameter selected from: a face detection matching option, an object detection matching option, a text detection matching option, a color matching option, or an audio tune matching option.

Example 11 includes the subject matter of any of Examples 1-10, and wherein to build the media query comprises to receive a scheduled output date for the media query from the user, and generation of the video output occurs at the scheduled output date.

Example 12 includes the subject matter of any of Examples 1-11, and wherein to transmit the media query to the cloud analytics service comprises to request scheduling of cloud resources based on the scheduled output date of the media query.

Example 13 includes the subject matter of any of Examples 1-12, and wherein to request scheduling of cloud resources comprises at least one of to request pre-allocation of cloud compute resources based on the scheduled output date of the media query; request pre-allocation of cloud storage resources based on the scheduled output date of the media query; request pre-allocation of cloud compute resources based on a location of the media query; or request pre-allocation of cloud storage resources based on a location of the media query.

Example 14 includes a cloud analytics server comprising a search module to receive a media query from a video editor, the media to include an acceptance policy that defines criteria of acceptable media data; and an analysis module to transmit the acceptance policy to a plurality of mobile computing devices; and receive media data transmitted from a mobile computing device in response to receiving the acceptance policy.

Example 15 includes the subject matter of Example 14, and wherein the media data comprises at least one of: video data, audio data, or still image data.

Example 16 includes the subject matter of any of Examples 14 and 15, and wherein to transmit the acceptance policy comprises to cause the mobile computing device to adjust media capture settings based on the acceptance policy.

Example 17 includes the subject matter of any of Examples 14-16, and wherein to transmit the acceptance policy further comprises to cause the mobile computing device to set a format of the media data based on a format parameter of the acceptance policy.

Example 18 includes the subject matter of any of Examples 14-17, and wherein to transmit the acceptance policy further comprises to cause the mobile computing device to set a resolution of the media data based on a resolution parameter of the acceptance policy.

Example 19 includes the subject matter of any of Examples 14-18, and wherein to transmit the acceptance policy comprises to cause the mobile computing device to display a capture assistance user interface based on the acceptance policy.

Example 20 includes the subject matter of any of Examples 14-19, and wherein to transmit the acceptance policy further comprises to cause the mobile computing device to display instructions that define the content of the media data based on the acceptance policy.

Example 21 includes the subject matter of any of Examples 14-20, and wherein to transmit the acceptance policy comprises to cause the mobile computing device to transmit the media data in response to the mobile computing device determining that the acceptance policy is satisfied.

Example 22 includes the subject matter of any of Examples 14-21, and wherein to transmit the acceptance policy further comprises to cause the mobile computing device to determine whether a capability of the mobile computing device satisfies a capability parameter of the acceptance policy.

Example 23 includes the subject matter of any of Examples 14-22, and wherein to determine whether a capability satisfies the capability parameter of the acceptance policy comprises at least one of to: (i) determine whether a processing capability of the mobile computing device satisfies the capability parameter, or (ii) determine whether a network connection quality of the mobile computing device satisfies the capability parameter.

Example 24 includes the subject matter of any of Examples 14-23, and wherein to determine that the acceptance policy is satisfied comprises, to determine, on the mobile computing device, whether the acceptance policy is satisfied based on at least one of: detection of faces represented in the media data, detection of objects represented in the media data, detection of text represented in the media data, or detection of an audio tune represented in the media data.

Example 25 includes the subject matter of any of Examples 14-24, and wherein the analysis module is further to process the media data; determine whether the media data satisfies the acceptance policy based on processing of the media data; and reject a portion of the media data in response to a determination that the portion of the media data does not satisfy the acceptance policy.

Example 26 includes the subject matter of any of Examples 14-25, and wherein to process the media data comprises at least one of to: detect faces represented in the media data, detect objects represented in the media data, detect text represented in the media data, or detect an audio tune represented in the media data.

Example 27 includes the subject matter of any of Examples 14-26, and, wherein the analysis module is further to determine whether the media data satisfies the acceptance policy prior to processing of the media data.

Example 28 includes the subject matter of any of Examples 14-27, and wherein to determine whether the media data satisfies the acceptance policy prior to processing of the media data comprises at least one of to determine whether metadata associated with the media data includes location data satisfying a location parameter of the acceptance policy; determine whether a format of the media data satisfies a format parameter of the acceptance policy, or determine whether capability information received from the mobile computing device satisfies a capability parameter of the acceptance policy, the capability information to define a media capture capability of the mobile computing device.

Example 29 includes the subject matter of any of Examples 14-28, and wherein to determine whether the format matches the format parameter comprises to determine whether a resolution of the media data satisfies a resolution parameter of the acceptance policy.

Example 30 includes the subject matter of any of Examples 14-29, and wherein the capability information comprises at least one of: information on a processing capability of the mobile computing device, or information on a network connection quality of the mobile computing device.

Example 31 includes a method for media editing, the method comprising building, on a video editor, a media query including a query parameter selected by a user of the video editor; associating, on the video editor, the media query with a dynamic content slot of a media program; transmitting the media query from the video editor to a cloud analytics service; receiving, on the video editor, query results from the cloud analytics service in response to the media query, the query results identifying a media clip produced by a mobile computing device; and generating, on the video editor, a video output based on the media program, the video output including the media clip identified in the query results inserted in the dynamic content slot.

Example 32 includes the subject matter of Example 31, and wherein generating the video output comprises automatically inserting the media clip identified in the query results into the dynamic content slot without direction from the user.

Example 33 includes the subject matter of any of Examples 31 and 32, and wherein receiving the query results and generating the video output occur contemporaneously with each other.

Example 34 includes the subject matter of any of Examples 31-33, and wherein generating the video output comprises transmitting the video output to a video device of a video consumer.

Example 35 includes the subject matter of any of Examples 31-34, and further including presenting, on the video editor, a user interface including the query results, and receiving, on the video editor, a user selection of a selected media clip identified in the query results; wherein generating the video output comprises generating the video output including the selected media clip inserted in the dynamic content slot.

Example 36 includes the subject matter of any of Examples 31-35, and wherein presenting the user interface including the query results and generating the video output occur contemporaneously with each other.

Example 37 includes the subject matter of any of Examples 31-36, and wherein generating the video output comprises transmitting the video output to a video device of a video consumer.

Example 38 includes the subject matter of any of Examples 31-37, and wherein building the media query including the query parameter comprises at least one of building a media query including a metadata query parameter to search description data associated with the media data; building a media query including a media query parameter to search content data derived from the media data; or building a sample media query parameter based on a sample media clip selected by the user.

Example 39 includes the subject matter of any of Examples 31-38, and wherein building the media query including the metadata query parameter comprises including a metadata query parameter selected from: a keyword, embedded metadata produced by the mobile computing device, a sentiment factor, a location, or a date.

Example 40 includes the subject matter of any of Examples 31-39, and wherein building the media query including the media query parameter comprises including a media query parameter selected from: an in-focus requirement, a stability requirement, a lighting requirement, an audio information requirement, or a motion requirement.

Example 41 includes the subject matter of any of Examples 31-40, and wherein building the media query including the query parameter further comprises including a sample media query parameter selected from: a face detection matching option, an object detection matching option, a text detection matching option, a color matching option, or an audio tune matching option.

Example 42 includes the subject matter of any of Examples 31-41, and wherein building the media query comprises receiving a scheduled output date for the media query from the user; and generating the video output occurs at the scheduled output date.

Example 43 includes the subject matter of any of Examples 31-42, and wherein transmitting the media query to the cloud analytics service comprises requesting scheduling of cloud resources based on the scheduled output date of the media query.

Example 44 includes the subject matter of any of Examples 31-43, and wherein requesting scheduling of cloud resources comprises at least one of requesting pre-allocation of cloud compute resources based on the scheduled output date of the media query; requesting pre-allocation of cloud storage resources based on the scheduled output date of the media query; requesting pre-allocation of cloud compute resources based on a location of the media query; or requesting pre-allocation of cloud storage resources based on a location of the media query.

Example 45 includes the subject matter of any of Examples 31-44, and wherein receiving the query results comprises receiving query results identifying at least one of: a video clip, an audio clip, or a still image produced by the mobile computing device.

Example 46 includes a method for collecting media captured by a plurality of mobile computing devices, the method comprising receiving, with a cloud analytics server from a video editor, a media query including an acceptance policy that defines criteria of acceptable media data; transmitting the acceptance policy from the cloud analytics server to the plurality of mobile computing devices; and receiving, with the cloud analytics server, media data transmitted from a mobile computing device in response to receiving the acceptance policy.

Example 47 includes the subject matter of Example 46, and wherein transmitting the acceptance policy comprises causing the mobile computing device to adjust media capture settings based on the acceptance policy.

Example 48 includes the subject matter of any of Examples 46 and 47, and wherein transmitting the acceptance policy further comprises causing the mobile computing device to set a format of the media data based on a format parameter of the acceptance policy.

Example 49 includes the subject matter of any of Examples 46-48, and wherein transmitting the acceptance policy further comprises causing the mobile computing device to set a resolution of the media data based on a resolution parameter of the acceptance policy.

Example 50 includes the subject matter of any of Examples 46-49, and wherein transmitting the acceptance policy comprises causing the mobile computing device to display a capture assistance user interface based on the acceptance policy.

Example 51 includes the subject matter of any of Examples 46-50, and wherein transmitting the acceptance policy further comprises causing the mobile computing device to display instructions that define the content of the media data based on the acceptance policy.

Example 52 includes the subject matter of any of Examples 46-51, and wherein transmitting the acceptance policy comprises causing the mobile computing device to transmit the media data in response to the mobile computing device determining that the acceptance policy is satisfied.

Example 53 includes the subject matter of any of Examples 46-52, and wherein transmitting the acceptance policy further comprises causing the mobile computing device to determine whether a capability of the mobile computing device satisfies a capability parameter of the acceptance policy.

Example 54 includes the subject matter of any of Examples 46-53, and wherein to determine whether a capability satisfies the capability parameter of the acceptance policy comprises at least one of: (i) to determine whether a processing capability of the mobile computing device satisfies the capability parameter, or (ii) to determine whether a network connection quality of the mobile computing device satisfies the capability parameter.

Example 55 includes the subject matter of any of Examples 46-54, and wherein determining that the acceptance policy is satisfied comprises, determining, on the mobile computing device, whether the acceptance policy is satisfied based on at least one of: detecting faces represented in the media data, detecting objects represented in the media data, detecting text represented in the media data, or detecting an audio tune represented in the media data.

Example 56 includes the subject matter of any of Examples 46-55, and further including processing, with the cloud analytics server, the media data; determining, with the cloud analytics server, whether the media data satisfies the acceptance policy based on processing the media data; and rejecting, with the cloud analytics server, a portion of the media data in response to determining that the portion of the media data does not satisfy the acceptance policy.

Example 57 includes the subject matter of any of Examples 46-56, and wherein processing the media data comprises at least one of: detecting faces represented in the media data, detecting objects represented in the media data, detecting text represented in the media data, or detecting an audio tune represented in the media data.

Example 58 includes the subject matter of any of Examples 46-57, and further including determining, with the cloud analytics server, whether the media data satisfies the acceptance policy prior to processing the media data.

Example 59 includes the subject matter of any of Examples 46-58, and wherein determining whether the media data satisfies the acceptance policy prior to processing the media data comprises at least one of (i) determining whether metadata associated with the media data includes location data satisfying a location parameter of the acceptance policy; (ii) determining whether a format of the media data satisfies a format parameter of the acceptance policy; or (iii) receiving, on the cloud analytics server, capability information from the mobile computing device, the capability information defining a media capture capability of the mobile computing device, and determining whether the capability information satisfies a capability parameter of the acceptance policy.

Example 60 includes the subject matter of any of Examples 46-59, and wherein determining whether the format matches the format parameter comprises determining whether a resolution of the media data satisfies a resolution parameter of the acceptance policy.

Example 61 includes the subject matter of any of Examples 46-60, and wherein receiving the capability information comprises at least one of: (i) receiving information on a processing capability of the mobile computing device or (ii) receiving information on a network connection quality of the mobile computing device.

Example 62 includes the subject matter of any of Examples 46-61, and wherein receiving the media data comprises receiving at least one of: video data, audio data, or still image data.

Example 63 includes a computing device comprising a processor; and a memory having stored therein a plurality of instructions that when executed by the processor cause the computing device to perform the method of any of Examples 31-62.

Example 64 includes one or more machine readable storage media comprising a plurality of instructions stored thereon that in response to being executed result in a computing device performing the method of any of Examples 31-62.

Example 65 includes a computing device comprising means for performing the method of any of Examples 31-62.

What is claimed is:

1. A mobile device comprising:
at least one memory; and
instructions on the mobile device; and
at least one processor to execute the instructions to at least:
   cause the mobile device to transmit an available network bandwidth of the mobile device to a cloud analytics server in association with a request for one or more media query parameters;
   in response to receipt of the one or more media query parameters, compare one or more capabilities of the mobile device to the one or more media query parameters associated with an acceptance policy to determine whether the one or more capabilities of the mobile device satisfy the one or more media query parameters associated with the acceptance policy, the one or more query parameters from the cloud analytics server;
   set a format of media data based on a format parameter of the one or more media query parameters from a cloud analytics server; and
   transmit the media data to the cloud analytics server in response to a determination that the one or more capabilities of the mobile device satisfy the one or more media query parameters associated with the acceptance policy.

2. The mobile device of claim 1, wherein the media data includes at least one of video data, audio data, or still image data.

3. The mobile device of claim 1, wherein the at least one processor is to adjust media capture settings in response to receipt of the one or more media query parameters from the cloud analytics server.

4. The mobile device of claim 3, wherein to adjust the media capture settings, the at least one processor is to set a resolution of the media data based on a resolution parameter of the acceptance policy.

5. The mobile device of claim 1, wherein the at least one processor is to cause the mobile device to display a capture assistance user interface in response to receipt of the one or more media query parameters from the cloud analytics server.

6. A cloud analytics server comprising:
at least one memory; and
instructions on the cloud analytics server; and
at least one processor to execute the instructions to at least:
   access a media query received from a video editor, the media query to include a selection having one of two possible settings to indicate whether one or more query parameters included in the media query are to be pushed by the cloud analytics server to a plurality of mobile computing devices, the selection to have a first value to indicate the one or more query parameters are to be pushed to the plurality of mobile computing devices, the selection to have a second value to indicate the one or more query parameters are not to be pushed to the plurality of mobile computing devices, the one or more query parameters to represent an acceptance policy that defines criteria of acceptable media data;
   transmit, in response to the selection included in the media query having the first value, the one or more query parameters to the plurality of mobile computing devices to cause at least one of the mobile computing devices to transmit media data in response to a determination by the at least one of the mobile computing devices that the acceptance policy is satisfied, the determination based on a comparison of at least one of the one or more query parameters to a capability of the at least one of the mobile computing devices, the comparison to determine whether the capability of the at least one of the mobile computing devices satisfies the at least one of the one or more query parameters of the acceptance policy; and receive the media data transmitted from the at least one of the mobile computing devices.

7. The cloud analytics server of claim 6, wherein the at least one processor is to:

process the media data to determine whether the media data satisfies the acceptance policy; and reject a portion of the media data in response to a determination that the portion of the media data does not satisfy the acceptance policy.

8. The cloud analytics server of claim 7, wherein to process the media data, the at least one processor is to at least one of detect faces represented in the media data, detect objects represented in the media data, detect text represented in the media data, or detect an audio tune represented in the media data.

9. The cloud analytics server of claim 7, wherein the at least one processor is to determine whether the media data satisfies the acceptance policy prior to the media data being processed.

10. The cloud analytics server of claim 9, wherein to determine whether the media data satisfies the acceptance policy prior to the media data being processed, the at least one processor is to at least one of:

determine whether metadata associated with the media data includes location data satisfying a location parameter of the acceptance policy;

determine whether a format of the media data satisfies a format parameter of the acceptance policy; or determine whether capability information received from the at least one of the mobile computing devices satisfies at least a second one of the one or more query parameters of the acceptance policy, the capability information to define a media capture capability of the at least one of the mobile computing devices.

11. The cloud analytics server of claim 10, wherein to determine whether the format matches the format parameter, the at least one processor is to determine whether a resolution of the media data satisfies a resolution parameter of the acceptance policy.

12. The cloud analytics server of claim 10, wherein the capability information includes at least one of: information on a processing capability of the at least one of the mobile computing devices, or information on a network connection quality of the at least one of the mobile computing devices.

13. A video editor apparatus comprising:
at least one memory; and
instructions on the apparatus; and
at least one processor to execute the instructions to at least:

build a media query including a query parameter selected by a user, the media query to be built based on a selection that is to indicate whether the query parameter is to be pushed to target mobile computing devices, the selection to have a first value to indicate the query parameter is to be pushed to the target mobile computing devices, the selection to have a second value to indicate the query parameter is not to be pushed to the target mobile computing devices;

associate the media query with a dynamic content slot of a media program;

transmit, to a cloud analytics service, the media query with a request for the cloud analytics service to push an acceptance policy and the query parameter included in the media query to the target mobile computing devices in response to the selection having the first value;

receive, as a video output that is based on the media program is generated, query results from the cloud analytics service, in response to the media query, the query results to identify a media clip produced by one or more of the target mobile computing devices;

present a user interface including the query results for selection by the user; and generate the video output based on the media program and replace the dynamic content slot with the media clip identified in the query results as the video output is transmitted to a video device of a video consumer.

14. The apparatus of claim 13, wherein the at least one processor is to:

obtain a user selection of a selected media clip identified in the query results; and generate the video output to have the selected media clip inserted in the dynamic content slot.

15. The apparatus of claim 13, wherein the at least one processor is to present the user interface including the query results and generate the video output contemporaneously with each other.

16. The apparatus of claim 13, wherein the query parameter includes a sample media query parameter based on a sample media clip selected by the user.

17. The apparatus of claim 16, wherein the sample media query parameter is selected from at least one of a face detection matching option, an object detection matching option, a text detection matching option, a color matching option, or an audio tune matching option.

18. The apparatus of claim 13, wherein the at least one processor is to build the media query to identify a sentiment to be represented in the media clip.

19. The apparatus of claim 13, wherein the at least one processor is to receive the query results within a time period of the generation of the video output.

* * * * *